US008700444B2

United States Patent
Singh

(10) Patent No.: US 8,700,444 B2
(45) Date of Patent: *Apr. 15, 2014

(54) SYSTEM FOR MONITORING OPTIMAL EQUIPMENT OPERATING PARAMETERS

(75) Inventor: Abtar Singh, Kennesaw, GA (US)

(73) Assignee: Emerson Retail Services Inc., Kennesaw, GA (US)

( * ) Notice: Subject to any disclaimer, the term of this patent is extended or adjusted under 35 U.S.C. 154(b) by 226 days.

This patent is subject to a terminal disclaimer.

(21) Appl. No.: 12/955,355

(22) Filed: Nov. 29, 2010

(65) Prior Publication Data

US 2011/0071960 A1 Mar. 24, 2011

Related U.S. Application Data

(63) Continuation of application No. 11/120,166, filed on May 2, 2005, now Pat. No. 7,844,366, which is a continuation of application No. 10/286,419, filed on Oct. 31, 2002, now Pat. No. 6,889,173.

(51) Int. Cl.
| | | |
|---|---|---|
| *G06Q 10/00* | (2012.01) | |
| *G06Q 30/00* | (2012.01) | |
| *G06F 17/00* | (2006.01) | |
| *G06G 7/00* | (2006.01) | |

(52) U.S. Cl.
USPC ............................ 705/7.35; 705/1.1; 705/400

(58) Field of Classification Search
USPC ................ 705/7.25, 7.35, 1.1, 7.11–7.42, 705/400–412; 702/57, 58, 60–62
See application file for complete search history.

(56) References Cited

U.S. PATENT DOCUMENTS

| 2,296,822 A | 9/1942 | Wolfed |
|---|---|---|
| 3,232,519 A | 2/1966 | Long |

(Continued)

FOREIGN PATENT DOCUMENTS

| CH | 173493 A | 11/1934 |
|---|---|---|
| DE | 842351 C | 6/1952 |

(Continued)

OTHER PUBLICATIONS

Office Action regarding U.S. Appl. No. 10/286,419, dated Jun. 10, 2004.

(Continued)

*Primary Examiner* — George Chen
(74) *Attorney, Agent, or Firm* — Harness, Dickey & Pierce, P.L.C.

(57) ABSTRACT

A method includes obtaining a present value of a set point for at least one piece of equipment with a remote monitor in communication with a controller that controls the at least one piece of equipment according to the set point. The method also includes determining a first power consumption rate with the remote monitor. The first power consumption rate corresponds to power consumption of the at least one piece of equipment while operating at the present value of the set point. The method also includes determining a second power consumption rate with the remote monitor. The second power consumption rate corresponds to power consumption of the at least one piece of equipment while operating at a predetermined benchmark value of the set point. The method also includes determining a monetary cost associated with a difference between the first power consumption rate and the second power consumption rate, based on a power consumption cost, when the first power consumption rate is greater than the second power consumption rate. The method also includes communicating the monetary cost, with the remote monitor, to a remote user.

22 Claims, 5 Drawing Sheets

(56) References Cited

U.S. PATENT DOCUMENTS

| | | | |
|---|---|---|---|
| 3,513,662 A | 5/1970 | Golber | |
| 3,585,451 A | 6/1971 | Day, III | |
| 3,653,783 A | 4/1972 | Sauder | |
| 3,735,377 A | 5/1973 | Kaufman | |
| 3,767,328 A | 10/1973 | Ladusaw | |
| 3,783,681 A | 1/1974 | Hirt et al. | |
| 3,924,972 A | 12/1975 | Szymaszek | |
| 4,060,716 A | 11/1977 | Pekrul et al. | |
| 4,090,248 A | 5/1978 | Swanson et al. | |
| 4,102,150 A | 7/1978 | Kountz | |
| 4,102,394 A | 7/1978 | Botts | |
| 4,112,703 A | 9/1978 | Kountz | |
| 4,132,086 A | 1/1979 | Kountz | |
| 4,151,725 A | 5/1979 | Kountz et al. | |
| 4,197,717 A * | 4/1980 | Schumacher | 62/213 |
| 4,205,381 A | 5/1980 | Games et al. | |
| 4,281,358 A | 7/1981 | Plouffe et al. | |
| 4,308,725 A | 1/1982 | Chiyoda | |
| 4,325,223 A | 4/1982 | Cantley | |
| 4,345,162 A | 8/1982 | Hammer et al. | |
| 4,372,119 A | 2/1983 | Gillbrand et al. | |
| 4,384,462 A | 5/1983 | Overman et al. | |
| 4,390,321 A | 6/1983 | Langlois et al. | |
| 4,390,922 A | 6/1983 | Pelliccia | |
| 4,399,548 A | 8/1983 | Castleberry | |
| 4,420,947 A | 12/1983 | Yoshino | |
| 4,425,010 A | 1/1984 | Bryant et al. | |
| 4,429,578 A | 2/1984 | Darrel et al. | |
| 4,434,390 A | 2/1984 | Elms | |
| 4,463,576 A | 8/1984 | Burnett et al. | |
| 4,467,613 A | 8/1984 | Behr et al. | |
| 4,470,092 A | 9/1984 | Lombardi | |
| 4,479,389 A | 10/1984 | Anderson, III et al. | |
| 4,494,383 A | 1/1985 | Nagatomo et al. | |
| 4,497,031 A | 1/1985 | Froehling et al. | |
| 4,502,842 A | 3/1985 | Currier et al. | |
| 4,502,843 A | 3/1985 | Martin | |
| 4,505,125 A | 3/1985 | Baglione | |
| 4,506,518 A | 3/1985 | Yoshikawa et al. | |
| 4,510,576 A | 4/1985 | MacArthur et al. | |
| 4,520,674 A | 6/1985 | Canada et al. | |
| 4,540,040 A | 9/1985 | Fukumoto et al. | |
| 4,555,910 A | 12/1985 | Sturges | |
| 4,563,878 A | 1/1986 | Baglione | |
| 4,567,733 A | 2/1986 | Mecozzi | |
| 4,575,318 A | 3/1986 | Blain | |
| 4,580,947 A | 4/1986 | Shibata et al. | |
| 4,604,036 A | 8/1986 | Sutou et al. | |
| 4,611,470 A | 9/1986 | Enstrom | |
| 4,614,089 A | 9/1986 | Dorsey | |
| 4,630,670 A | 12/1986 | Wellman et al. | |
| 4,653,280 A | 3/1987 | Hansen et al. | |
| 4,655,688 A | 4/1987 | Bohn et al. | |
| 4,660,386 A | 4/1987 | Hansen et al. | |
| 4,703,325 A | 10/1987 | Chamberlin et al. | |
| 4,715,792 A | 12/1987 | Nishizawa et al. | |
| 4,716,957 A | 1/1988 | Thompson et al. | |
| 4,755,957 A | 7/1988 | White et al. | |
| 4,768,346 A | 9/1988 | Mathur | |
| 4,787,213 A | 11/1988 | Gras et al. | |
| 4,796,466 A | 1/1989 | Farmer | |
| 4,798,055 A | 1/1989 | Murray et al. | |
| 4,831,560 A | 5/1989 | Zaleski | |
| 4,831,832 A | 5/1989 | Alsenz | |
| 4,838,037 A | 6/1989 | Wood | |
| 4,843,575 A | 6/1989 | Crane | |
| 4,856,286 A | 8/1989 | Sulfstede et al. | |
| 4,877,382 A | 10/1989 | Caillat et al. | |
| 4,881,184 A | 11/1989 | Abegg, III et al. | |
| 4,882,747 A | 11/1989 | Williams | |
| 4,884,412 A | 12/1989 | Sellers et al. | |
| 4,885,707 A | 12/1989 | Nichol et al. | |
| 4,904,993 A | 2/1990 | Sato | |
| 4,909,076 A | 3/1990 | Busch et al. | |
| 4,913,625 A | 4/1990 | Gerlowski | |
| 4,924,404 A | 5/1990 | Reinke, Jr. | |
| 4,928,750 A | 5/1990 | Nurczyk | |
| 4,949,550 A | 8/1990 | Hanson | |
| 4,964,060 A | 10/1990 | Hartsog | |
| 4,974,427 A | 12/1990 | Diab | |
| 4,985,857 A | 1/1991 | Bajpai et al. | |
| 4,990,893 A | 2/1991 | Kiluk | |
| 5,009,074 A | 4/1991 | Goubeaux et al. | |
| 5,018,357 A | 5/1991 | Livingstone et al. | |
| 5,022,234 A | 6/1991 | Goubeaux et al. | |
| 5,051,720 A | 9/1991 | Kittirutsunetorn | |
| 5,056,036 A | 10/1991 | Van Bork | |
| 5,058,388 A | 10/1991 | Shaw et al. | |
| 5,070,468 A | 12/1991 | Niinomi et al. | |
| 5,071,065 A | 12/1991 | Aalto et al. | |
| 5,073,862 A | 12/1991 | Carlson | |
| 5,076,067 A | 12/1991 | Prenger et al. | |
| 5,086,385 A | 2/1992 | Launey et al. | |
| 5,088,297 A | 2/1992 | Maruyama et al. | |
| 5,099,654 A | 3/1992 | Baruschke et al. | |
| 5,109,222 A | 4/1992 | Welty | |
| 5,109,700 A | 5/1992 | Hicho | |
| 5,115,406 A | 5/1992 | Zatezalo et al. | |
| 5,115,967 A | 5/1992 | Wedekind | |
| 5,119,466 A | 6/1992 | Suzuki | |
| 5,131,237 A | 7/1992 | Valbjorn | |
| 5,156,539 A | 10/1992 | Anderson et al. | |
| 5,181,389 A | 1/1993 | Hanson et al. | |
| 5,203,178 A | 4/1993 | Shyu | |
| 5,203,179 A | 4/1993 | Powell | |
| 5,209,076 A | 5/1993 | Kauffman et al. | |
| 5,209,400 A | 5/1993 | Winslow et al. | |
| 5,224,835 A | 7/1993 | Oltman | |
| 5,226,472 A | 7/1993 | Benevelli et al. | |
| 5,228,304 A | 7/1993 | Ryan | |
| 5,241,664 A | 8/1993 | Ohba et al. | |
| 5,243,827 A | 9/1993 | Hagita et al. | |
| 5,265,434 A | 11/1993 | Alsenz | |
| 5,279,458 A | 1/1994 | DeWolf et al. | |
| 5,282,728 A | 2/1994 | Swain | |
| 5,284,026 A | 2/1994 | Powell | |
| 5,299,504 A | 4/1994 | Abele | |
| 5,303,560 A | 4/1994 | Hanson et al. | |
| 5,311,451 A | 5/1994 | Barrett | |
| 5,316,448 A | 5/1994 | Ziegler et al. | |
| 5,335,507 A | 8/1994 | Powell | |
| 5,362,206 A | 11/1994 | Westerman et al. | |
| 5,381,692 A | 1/1995 | Winslow et al. | |
| 5,395,042 A | 3/1995 | Riley et al. | |
| 5,415,008 A | 5/1995 | Bessler | |
| 5,416,781 A | 5/1995 | Ruiz | |
| 5,423,190 A | 6/1995 | Friedland | |
| 5,423,192 A | 6/1995 | Young et al. | |
| 5,426,952 A | 6/1995 | Bessler | |
| 5,431,026 A | 7/1995 | Jaster | |
| 5,435,145 A | 7/1995 | Jaster | |
| 5,440,890 A | 8/1995 | Bahel et al. | |
| 5,440,891 A | 8/1995 | Hindmon, Jr. et al. | |
| 5,440,895 A | 8/1995 | Bahel et al. | |
| 5,446,677 A | 8/1995 | Jensen et al. | |
| 5,450,359 A | 9/1995 | Sharma et al. | |
| 5,452,291 A | 9/1995 | Eisenhandler et al. | |
| 5,454,229 A | 10/1995 | Hanson et al. | |
| 5,457,965 A | 10/1995 | Blair et al. | |
| 5,460,006 A | 10/1995 | Torimitsu | |
| 5,467,264 A | 11/1995 | Rauch et al. | |
| 5,481,481 A | 1/1996 | Frey et al. | |
| 5,481,884 A | 1/1996 | Scoccia | |
| 5,483,141 A | 1/1996 | Uesugi | |
| 5,509,786 A | 4/1996 | Mizutani et al. | |
| 5,511,387 A | 4/1996 | Tinsler | |
| 5,515,692 A * | 5/1996 | Sterber et al. | 62/154 |
| 5,519,301 A | 5/1996 | Yoshida et al. | |
| 5,528,908 A | 6/1996 | Bahel et al. | |
| 5,546,756 A | 8/1996 | Ali | |
| 5,546,757 A | 8/1996 | Whipple, III | |
| 5,548,966 A | 8/1996 | Tinsler | |
| 5,555,195 A | 9/1996 | Jensen et al. | |
| 5,570,085 A | 10/1996 | Bertsch | |

(56) References Cited

U.S. PATENT DOCUMENTS

| | | |
|---|---|---|
| 5,570,258 A | 10/1996 | Manning |
| 5,572,643 A | 11/1996 | Judson |
| 5,586,445 A | 12/1996 | Bessler |
| 5,596,507 A | 1/1997 | Jones et al. |
| 5,602,749 A | 2/1997 | Vosburgh |
| 5,602,757 A | 2/1997 | Haseley et al. |
| 5,610,339 A | 3/1997 | Haseley et al. |
| 5,630,325 A | 5/1997 | Bahel et al. |
| 5,641,270 A | 6/1997 | Sgourakes et al. |
| 5,655,379 A | 8/1997 | Jaster et al. |
| 5,655,380 A | 8/1997 | Calton |
| 5,689,963 A | 11/1997 | Bahel et al. |
| 5,694,010 A | 12/1997 | Oomura et al. |
| 5,696,501 A | 12/1997 | Ouellette et al. |
| 5,707,210 A | 1/1998 | Ramsey et al. |
| 5,713,724 A | 2/1998 | Centers et al. |
| 5,715,704 A | 2/1998 | Cholkeri et al. |
| 5,724,571 A | 3/1998 | Woods |
| 5,741,120 A | 4/1998 | Bass et al. |
| 5,743,109 A | 4/1998 | Schulak |
| 5,745,114 A | 4/1998 | King et al. |
| 5,752,385 A | 5/1998 | Nelson |
| 5,761,083 A | 6/1998 | Brown, Jr. et al. |
| 5,764,509 A | 6/1998 | Gross et al. |
| 5,867,998 A | 2/1999 | Guertin |
| 5,875,430 A | 2/1999 | Koether |
| 5,875,638 A | 3/1999 | Tinsler |
| 5,900,801 A | 5/1999 | Heagle et al. |
| 5,904,049 A | 5/1999 | Jaster et al. |
| 5,924,295 A | 7/1999 | Park |
| 5,930,773 A | 7/1999 | Crooks et al. |
| 5,939,974 A | 8/1999 | Heagle et al. |
| 5,946,922 A | 9/1999 | Viard et al. |
| 5,947,693 A | 9/1999 | Yang |
| 5,953,490 A | 9/1999 | Wiklund et al. |
| 5,956,658 A | 9/1999 | McMahon |
| 5,975,854 A | 11/1999 | Culp, III et al. |
| 5,984,645 A | 11/1999 | Cummings |
| 5,986,571 A | 11/1999 | Flick |
| 6,006,171 A | 12/1999 | Vines et al. |
| 6,035,661 A | 3/2000 | Sunaga et al. |
| 6,038,871 A | 3/2000 | Gutierrez et al. |
| 6,047,557 A | 4/2000 | Pham et al. |
| 6,052,731 A | 4/2000 | Holdsworth et al. |
| 6,081,750 A | 6/2000 | Hoffberg et al. |
| 6,088,659 A | 7/2000 | Kelley et al. |
| 6,088,688 A | 7/2000 | Crooks et al. |
| 6,098,893 A | 8/2000 | Berglund et al. |
| 6,122,603 A | 9/2000 | Budike, Jr. |
| 6,125,642 A | 10/2000 | Seener et al. |
| 6,129,527 A | 10/2000 | Donahoe et al. |
| 6,138,461 A | 10/2000 | Park et al. |
| 6,145,328 A | 11/2000 | Choi |
| 6,153,942 A | 11/2000 | Roseman et al. |
| 6,153,993 A | 11/2000 | Oomura et al. |
| 6,169,979 B1 | 1/2001 | Johnson |
| 6,176,686 B1 | 1/2001 | Wallis et al. |
| 6,178,362 B1 | 1/2001 | Woolard et al. |
| 6,179,214 B1 | 1/2001 | Key et al. |
| 6,191,545 B1 | 2/2001 | Kawabata et al. |
| 6,213,731 B1 | 4/2001 | Doepker et al. |
| 6,215,405 B1 | 4/2001 | Handley et al. |
| 6,223,544 B1 | 5/2001 | Seem |
| 6,240,733 B1 | 6/2001 | Brandon et al. |
| 6,240,736 B1 | 6/2001 | Fujita et al. |
| 6,244,061 B1 | 6/2001 | Takagi et al. |
| 6,266,968 B1 | 7/2001 | Redlich |
| 6,268,664 B1 | 7/2001 | Rolls et al. |
| 6,272,868 B1 | 8/2001 | Grabon et al. |
| 6,276,901 B1 | 8/2001 | Farr et al. |
| 6,290,043 B1 | 9/2001 | Ginder et al. |
| 6,293,114 B1 | 9/2001 | Kamemoto |
| 6,302,654 B1 | 10/2001 | Millet et al. |
| 6,324,854 B1 | 12/2001 | Jayanth |
| 6,327,541 B1 | 12/2001 | Pitchford et al. |
| 6,334,093 B1 | 12/2001 | More |
| 6,349,883 B1 | 2/2002 | Simmons et al. |
| 6,366,889 B1* | 4/2002 | Zaloom ................ 705/7.37 |
| 6,378,315 B1 | 4/2002 | Gelber et al. |
| 6,393,848 B2 | 5/2002 | Roh et al. |
| 6,397,606 B1 | 6/2002 | Roh et al. |
| 6,408,258 B1 | 6/2002 | Richer |
| 6,453,687 B2 | 9/2002 | Sharood et al. |
| 6,466,971 B1 | 10/2002 | Humpleman et al. |
| 6,471,486 B1 | 10/2002 | Centers et al. |
| 6,487,457 B1 | 11/2002 | Hull et al. |
| 6,502,409 B1 | 1/2003 | Gatling et al. |
| 6,510,350 B1 | 1/2003 | Steen, III et al. |
| 6,526,766 B1 | 3/2003 | Hiraoka et al. |
| 6,529,839 B1 | 3/2003 | Uggerud et al. |
| 6,535,859 B1* | 3/2003 | Yablonowski et al. ....... 705/412 |
| 6,553,774 B1 | 4/2003 | Ishio et al. |
| 6,571,280 B1 | 5/2003 | Hubacher |
| 6,571,566 B1 | 6/2003 | Temple et al. |
| 6,574,561 B2 | 6/2003 | Alexander et al. |
| 6,577,962 B1 | 6/2003 | Afshari |
| 6,578,373 B1 | 6/2003 | Barbier |
| 6,583,720 B1 | 6/2003 | Quigley |
| 6,591,620 B2 | 7/2003 | Kikuchi et al. |
| 6,601,397 B2 | 8/2003 | Pham et al. |
| 6,609,078 B2 | 8/2003 | Starling et al. |
| 6,618,709 B1 | 9/2003 | Sneeringer |
| 6,622,925 B2 | 9/2003 | Carner et al. |
| 6,636,893 B1 | 10/2003 | Fong |
| 6,662,584 B1 | 12/2003 | Whiteside |
| 6,675,591 B2 | 1/2004 | Singh et al. |
| 6,708,508 B2 | 3/2004 | Demuth et al. |
| 6,785,592 B1 | 8/2004 | Smith et al. |
| 6,816,811 B2 | 11/2004 | Seem |
| 6,889,173 B2 | 5/2005 | Singh |
| 6,892,546 B2 | 5/2005 | Singh et al. |
| 6,900,738 B2 | 5/2005 | Crichlow |
| 6,904,385 B1 | 6/2005 | Budike, Jr. |
| 6,922,155 B1 | 7/2005 | Evans et al. |
| 6,968,295 B1 | 11/2005 | Carr |
| 6,978,225 B2 | 12/2005 | Retlich et al. |
| 6,990,821 B2 | 1/2006 | Singh et al. |
| 6,996,441 B1 | 2/2006 | Tobias |
| 6,997,390 B2 | 2/2006 | Alles |
| 7,003,378 B2 | 2/2006 | Poth |
| 7,024,870 B2 | 4/2006 | Singh et al. |
| 7,039,532 B2 | 5/2006 | Hunter |
| 7,043,339 B2 | 5/2006 | Maeda et al. |
| 7,043,459 B2 | 5/2006 | Peevey |
| 7,091,847 B2 | 8/2006 | Capowski et al. |
| 7,114,343 B2 | 10/2006 | Kates |
| 7,130,832 B2 | 10/2006 | Bannai et al. |
| 7,159,408 B2 | 1/2007 | Sadegh et al. |
| 7,246,014 B2 | 7/2007 | Forth et al. |
| 7,290,398 B2 | 11/2007 | Wallace et al. |
| 7,328,192 B1 | 2/2008 | Stengard et al. |
| 7,330,886 B2 | 2/2008 | Childers et al. |
| 7,337,191 B2 | 2/2008 | Haeberle et al. |
| 7,440,560 B1 | 10/2008 | Barry |
| 7,454,439 B1 | 11/2008 | Gansner et al. |
| 7,490,477 B2 | 2/2009 | Singh et al. |
| 7,555,364 B2 | 6/2009 | Poth et al. |
| 7,594,407 B2 | 9/2009 | Singh et al. |
| 7,596,959 B2 | 10/2009 | Singh et al. |
| 7,636,901 B2 | 12/2009 | Munson et al. |
| 7,644,591 B2 | 1/2010 | Singh et al. |
| 7,665,315 B2 | 2/2010 | Singh et al. |
| 7,752,853 B2 | 7/2010 | Singh et al. |
| 7,752,854 B2 | 7/2010 | Singh et al. |
| 7,844,366 B2 | 11/2010 | Singh |
| 7,885,959 B2 | 2/2011 | Horowitz et al. |
| 7,885,961 B2 | 2/2011 | Horowitz et al. |
| 8,065,886 B2 | 11/2011 | Singh et al. |
| 2001/0025349 A1 | 9/2001 | Sharood et al. |
| 2001/0054291 A1 | 12/2001 | Roh et al. |
| 2002/0000092 A1 | 1/2002 | Sharood et al. |
| 2002/0007388 A1* | 1/2002 | Bannai et al. ................ 709/104 |
| 2002/0020175 A1 | 2/2002 | Street et al. |
| 2002/0029575 A1 | 3/2002 | Okamoto |

(56) References Cited

U.S. PATENT DOCUMENTS

| | | | |
|---|---|---|---|
| 2002/0082924 A1 | 6/2002 | Koether | |
| 2002/0103655 A1* | 8/2002 | Boies et al. | 705/1 |
| 2002/0118106 A1 | 8/2002 | Brenn | |
| 2002/0143482 A1 | 10/2002 | Karanam et al. | |
| 2002/0161545 A1 | 10/2002 | Starling et al. | |
| 2002/0163436 A1 | 11/2002 | Singh et al. | |
| 2002/0173929 A1 | 11/2002 | Seigel | |
| 2002/0198629 A1 | 12/2002 | Ellis | |
| 2003/0004660 A1* | 1/2003 | Hunter | 702/61 |
| 2003/0005710 A1 | 1/2003 | Singh et al. | |
| 2003/0070438 A1* | 4/2003 | Kikuchi et al. | 62/141 |
| 2003/0077179 A1 | 4/2003 | Collins et al. | |
| 2003/0213851 A1 | 11/2003 | Burd et al. | |
| 2003/0216888 A1 | 11/2003 | Ridolfo | |
| 2004/0019584 A1 | 1/2004 | Greening et al. | |
| 2004/0068390 A1 | 4/2004 | Saunders | |
| 2004/0159113 A1 | 8/2004 | Singh et al. | |
| 2004/0239266 A1 | 12/2004 | Lee et al. | |
| 2004/0261431 A1 | 12/2004 | Singh et al. | |
| 2005/0043923 A1 | 2/2005 | Forster et al. | |
| 2005/0073532 A1 | 4/2005 | Scott et al. | |
| 2005/0086341 A1 | 4/2005 | Enga et al. | |
| 2005/0126190 A1 | 6/2005 | Lifson et al. | |
| 2005/0131624 A1 | 6/2005 | Gaessler et al. | |
| 2005/0169636 A1 | 8/2005 | Aronson et al. | |
| 2005/0198063 A1 | 9/2005 | Thomas et al. | |
| 2005/0204756 A1 | 9/2005 | Dobmeier et al. | |
| 2006/0020426 A1 | 1/2006 | Singh | |
| 2006/0021362 A1 | 2/2006 | Sadegh et al. | |
| 2006/0032245 A1 | 2/2006 | Kates | |
| 2006/0074917 A1 | 4/2006 | Chand et al. | |
| 2006/0138866 A1 | 6/2006 | Bergmann et al. | |
| 2006/0242200 A1 | 10/2006 | Horowitz et al. | |
| 2006/0271589 A1 | 11/2006 | Horowitz et al. | |
| 2006/0271623 A1 | 11/2006 | Horowitz et al. | |
| 2007/0006124 A1 | 1/2007 | Ahmed et al. | |
| 2007/0089434 A1 | 4/2007 | Singh et al. | |
| 2007/0089439 A1 | 4/2007 | Singh et al. | |
| 2007/0239894 A1 | 10/2007 | Thind et al. | |
| 2008/0058970 A1 | 3/2008 | Perumalsamy et al. | |
| 2009/0093916 A1 | 4/2009 | Parsonnet et al. | |
| 2010/0179703 A1 | 7/2010 | Singh et al. | |
| 2010/0305718 A1 | 12/2010 | Clark et al. | |

FOREIGN PATENT DOCUMENTS

| | | | |
|---|---|---|---|
| DE | 764179 C | 4/1953 | |
| DE | 1144461 B | 2/1963 | |
| DE | 1403516 A1 | 10/1968 | |
| DE | 1403467 A1 | 10/1969 | |
| DE | 3133502 A1 | 6/1982 | |
| DE | 3422398 A1 | 12/1985 | |
| EP | 0085246 A1 | 8/1983 | |
| EP | 0254253 A2 | 1/1988 | |
| EP | 0351833 A2 | 1/1990 | |
| EP | 0410330 A2 | 1/1991 | |
| EP | 0419857 A2 | 4/1991 | |
| EP | 0453302 A1 | 10/1991 | |
| EP | 0479421 A1 | 4/1992 | |
| EP | 0557023 A1 | 8/1993 | |
| EP | 0579374 A1 | 1/1994 | |
| EP | 0660213 A2 | 6/1995 | |
| EP | 0747598 A2 | 12/1996 | |
| EP | 0877462 A1 | 11/1998 | |
| EP | 0982497 A1 | 3/2000 | |
| EP | 1008816 A2 | 6/2000 | |
| EP | 1087142 A2 | 3/2001 | |
| EP | 1138949 A2 | 10/2001 | |
| EP | 1139037 A1 | 10/2001 | |
| EP | 1187021 A2 | 3/2002 | |
| EP | 1209427 A1 | 5/2002 | |
| EP | 1241417 A1 | 9/2002 | |
| EP | 1393034 A1 | 3/2004 | |
| FR | 2582430 A1 | 11/1986 | |
| FR | 2589561 A1 | 5/1987 | |
| FR | 2628558 A1 | 9/1989 | |
| FR | 2660739 A1 | 10/1991 | |
| GB | 2062919 A | 5/1981 | |
| GB | 2064818 A | 6/1981 | |
| GB | 2116635 A | 9/1983 | |
| JP | 5610639 | 2/1981 | |
| JP | 59145392 A | 8/1984 | |
| JP | 61046485 A | 3/1986 | |
| JP | 62116844 A | 5/1987 | |
| JP | 01014554 A | 1/1989 | |
| JP | 02110242 A | 4/1990 | |
| JP | 02294580 A | 12/1990 | |
| JP | 04080578 A | 3/1992 | |
| JP | 06058273 A | 3/1994 | |
| JP | 08087229 A | 4/1996 | |
| JP | 08284842 A | 10/1996 | |
| JP | 2003018883 A | 1/2003 | |
| JP | 2005241089 A | 9/2005 | |
| JP | 2005345096 A | 12/2005 | |
| WO | 8601262 A1 | 2/1986 | |
| WO | 8703988 A1 | 7/1987 | |
| WO | 8802527 A1 | 4/1988 | |
| WO | 9718636 A2 | 5/1997 | |
| WO | 9748161 A1 | 12/1997 | |
| WO | 9917066 A1 | 4/1999 | |
| WO | 0214968 A1 | 2/2002 | |
| WO | 02090840 A2 | 11/2002 | |
| WO | 02090913 A1 | 11/2002 | |
| WO | 02090914 A1 | 11/2002 | |
| WO | 2005022049 A2 | 3/2005 | |
| WO | 2006091521 A2 | 8/2006 | |
| WO | 2010138831 A2 | 12/2010 | |

OTHER PUBLICATIONS

Notice of Allowance and Notice of Allowability regarding U.S. Appl. No. 10/286,419, dated Dec. 2, 2004.
Office Action regarding U.S. Appl. No. 11/120,166, dated Oct. 2, 2006.
Office Action regarding U.S. Appl. No. 11/120,166, dated Apr. 12, 2007.
Office Action regarding U.S. Appl. No. 11/120,166, dated Oct. 2, 2007.
Office Action regarding U.S. Appl. No. 11/120,166, dated Jun. 5, 2008.
Office Action regarding U.S. Appl. No. 11/120,166, dated Dec. 15, 2008.
Office Action regarding U.S. Appl. No. 11/120,166, dated Jul. 20, 2009.
Office Action regarding U.S. Appl. No. 11/120,166, dated Feb. 17, 2010.
International Search Report regarding Application No. PCT/US2010/036601, mailed Dec. 29, 2010.
Written Opinion of the International Searching Authority regarding Application No. PCT/US2010/036601, mailed Dec. 29, 2010.
European Search Report for EP 01 30 1752; Mar. 26, 2002; 4 Pages.
European Search Report for EP 01 30 7547; Feb. 20, 2002; 1 Page.
European Search Report for EP 02 25 0266; May 17, 2002; 3 Pages.
European Search Report for EP 02 72 9050, Jun. 17, 2004, 2 pages.
Supplementary European Search Report for EP 02 73 1544, Jun. 18, 2004, 2 Pages.
European Search Report for EP 82306809.3; Apr. 28, 1983; 1 Page.
European Search Report for EP 91 30 3518; Jul. 22, 1991; 1 Page.
European Search Report for EP 93 30 4470; Oct. 26, 1993; 1 Page.
European Search Report for EP 94 30 3484; Apr. 3, 1997; 1 Page.
European Search Report for EP 96 30 4219; Dec. 1, 1998; 2 Pages.
European Search Report for EP 98 30 3525; May 28, 1999; 2 Pages.
European Search Report for EP 99 30 6052; Dec. 28, 1999; 3 Pages.
First Office Action from the Patent Office of the People's Republic of China, dated Jun. 8, 2007, Application No. 200480027753.6 and Translation provided by CCPIT.
First Official Report regarding Australian Patent Application No. 2007214381, dated Dec. 12, 2008.
International Search Report for PCT/US02/13459; ISA/US; date mailed Sep. 19, 2002.

(56) References Cited

OTHER PUBLICATIONS

International Search Report, Int'l. App. No. PCT/US 06/05917, dated Sep. 26, 2007.
International Search Report; International Application No. PCT/IB96/01435; May 23, 1997; 1 Page.
International Search Report; International Application No. PCT/US98/18710; Jan. 26, 1999; 1 Page.
Intl Search Report for PCT/US02/13456 dated Aug. 22, 2002.
Intl Search Report for PCT/US06/040964, dated Feb. 15, 2007.
Intl Search Report for PCT/US2004/027654 dated Aug. 25, 2004, 4 Pages.
Liao et al., "A Correlation of Optimal Heat Rejection Pressures in Transcritical Carbon Dioxide Cycles," Applied Thermal Engineering 20 (2000) 831-841.
Pin Carmen, Baranyi Jozsef, P, "Predictive models as means to quantify the interactions of spoilage organisms," International Journal of Food Microbiology, 41 (1998) 59-72.
Second Official Report regarding Australian Patent Application No. 2007214381, dated Oct. 30, 2009.
Supplementary European Search Report regarding Application No. PCT/US2006/005917, dated Nov. 23, 2009.
Torcellini, P., et al., "Evaluation of the Energy Performance and Design Process of the Thermal Test Facility at the National Renewable Energy Laboratory", dated Feb. 2005.
Ultrasite User's Guide BCU Supplement, Computer Process Controls, Sep. 4, 1997.
Ultrasite 32 User's Guide, Computer Process Controls, Sep. 28, 1999.
Ultrasite User's Guide BEC Supplement, Computer Process Controls, Oct. 6, 1997.
Ultrasite User's Guide RMCC Supplement, Computer Process Controls, Jun. 9, 1997.
UltraSite User's Guide, Computer Process Controls, Apr. 1, 1996.
Vandenbrink et al., "Design of a Refrigeration Cycle Evaporator Unit," Apr. 18, 2003.
Written Opinion of the International Searching Authority, Int'l. App. No. PCT/US 06105917, dated Sep. 26, 2007.
Office Action regarding U.S. Appl. No. 10/061,964, dated Oct. 3, 2003.
Final Office Action regarding U.S. Appl. No. 10/061,964, dated Mar. 8, 2004.
Notice of Allowance regarding U.S. Appl. No. 10/061,964, dated Jul. 19, 2004.
Restriction Requirement regarding U.S. Appl. No. 10/940,877, dated Jul. 25, 2005.
Office Action regarding U.S. Appl. No. 10/940,877, dated Nov. 14, 2005.
Final Office Action regarding U.S. Appl. No. 10/940,877, dated May 2, 2006.
Notice of Allowance regarding U.S. Appl. No. 12/685,424, dated Apr. 25, 2011.
Office Action regarding U.S. Appl. No. 10/675,137, dated Sep. 7, 2004.
Office Action regarding U.S. Appl. No. 10/675,137, dated Feb. 4, 2005.
Office Action regarding U.S. Appl. No. 10/675,137, dated Jun. 29, 2005.
Notice of Allowance and Notice of Allowability regarding U.S. Appl. No. 10/675,137, dated Dec. 16, 2005.
Office Action regarding U.S. Appl. No. 10/940,877, dated Oct. 27, 2006.
Examiner Interview Summary regarding U.S. Appl. No. 10/940,877, dated Mar. 2, 2007.
Office Action regarding U.S. Appl. No. 10/940,877, dated May 21, 2007.
Final Office Action regarding U.S. Appl. No. 10/940,877, dated Nov. 13, 2007.
Examiner Interview Summary regarding U.S. Appl. No. 10/940,877, dated Mar. 25, 2008.
Office Action regarding U.S. Appl. No. 10/940,877, dated Jun. 5, 2008.
Office Action regarding U.S. Appl. No. 10/940,877, dated Dec. 8, 2008.
Examiner Interview Summary regarding U.S. Appl. No. 10/940,877, dated Dec. 8, 2008.
Final Office Action regarding U.S. Appl. No. 10/940,877, dated Apr. 27, 2009.
Notice of Allowance regarding U.S. Appl. No. 10/940,877, dated Sep. 4, 2009.
Notice of Allowance for U.S. Appl. No. 10/698,048, dated Sep. 1, 2005.
Office Action regarding U.S. Appl. No. 10/698,048, dated Mar. 21, 2005.
Office Action regarding U.S. Appl. No. 11/337,918, dated Mar. 25, 2008.
Office Action regarding U.S. Appl. No. 11/337,918, dated Oct. 28, 2008.
Office Action regarding U.S. Appl. No. 11/337,918, dated Aug. 17, 2009.
Final Office action regarding U.S. Appl. No. 11/337,918, dated Feb. 4, 2010.
Examiner's First Report on Australian Patent Application No. 2002259066, dated Mar. 1, 2006.
European Search Report regarding Application No. EP02729051, dated Feb. 17, 2005.
Second Examination Communication regarding European Application No. EP02729051.9, dated Jul. 3, 2006.
First Examination Communication regarding European Application No. EP02729051.9, dated Dec. 23, 2005.
International Preliminary Examination Report regarding PCT/US02/13459, dated Sep. 15, 2003.
Written Opinion regarding PCT/US02/13459, dated Apr. 23, 2003.
Final Office Action regarding U.S. Appl. No. 11/337,918, dated Feb. 17, 2011.
Office Action regarding U.S. Appl. No. 13/303,286, dated Mar. 26, 2012.
Notice of Allowance regarding U.S. Appl. No. 13/303,286, dated Jul. 19, 2012.
Notice of Allowance and Fee(s) Due regarding U.S. Appl. No. 12/789,562, dated Oct. 26, 2012.

\* cited by examiner

SYSTEM FOR MONITORING OPTIMAL EQUIPMENT OPERATING PARAMETERS

CROSS-REFERENCE TO RELATED APPLICATIONS

This application is a continuation of U.S. patent application Ser. No. 11/120,166 filed on May 2, 2005, which is a continuation of U.S. patent application Ser. No. 10/286,419 filed on Oct. 31, 2002. The entire disclosures of each of the above applications are incorporated herein by reference.

FIELD

The present disclosure relates to monitoring equipment operating parameters and, more particularly, to a system and method for monitoring optimal equipment parameters of equipment for refrigeration, HVAC, lighting, anti-condensate heating, and other systems.

BACKGROUND

Retail outlets, particularly food retailers, require a plurality of systems during operation. Such systems often include refrigeration, HVAC, lighting, anti-condensate heating (ACH), and defrost control systems. Each of these systems include associated equipment to perform various functions. For example, refrigeration systems include compressors, condensers, evaporators, and the like to cool refrigeration cases to a desired temperature.

The various types of equipment include operating parameters, or set points, at which the equipment operates. The set point defines the operating condition of the equipment and is adjusted to provide a desired output from the equipment. For example, a set point of an electronic pressure regulator is adjusted to maintain a desired pressure within an evaporator of a refrigeration system. Because the equipment of the various systems consume power during their operation, the amount of power consumed by a particular piece of equipment corresponds to the set point value. Thus, if a set point is changed, the amount of power consumed by the equipment correspondingly changes.

Generally, a retailer configures the particular systems of its associated retail locations to operate at an optimized level. Thus, optimized set points are determined and set, whereby the systems operate in a desired manner, typically efficiently. However, set point changes can occur for various reasons, including maintenance, cleaning, and the like. Often, the set points are not returned to their previous levels, resulting in the systems operating in an undesired manner or at inefficient levels. Traditionally, it is difficult for a retailer to routinely monitor the set points of the systems of its various retail locations. As a result, the systems of the retail locations operating in an undesired manner or at inefficient levels incur significant cost to the retailer over time.

SUMMARY

A method is disclosed that may include obtaining a present value of a set point for at least one piece of equipment with a remote monitor in communication with a controller that controls the at least one piece of equipment according to the set point. The method may also include determining a first power consumption rate with the remote monitor, the first power consumption rate corresponding to power consumption of the at least one piece of equipment while operating at the present value of the set point. The method may also include determining a second power consumption rate with the remote monitor, the second power consumption rate corresponding to power consumption of the at least one piece of equipment while operating at a predetermined benchmark value of the set point. The method may also include determining a monetary cost associated with a difference between the first power consumption rate and the second power consumption rate, based on a power consumption cost, when the first power consumption rate is greater than the second power consumption rate. The method may also include communicating the monetary cost, with the remote monitor, to a remote user.

A system is also disclosed that may include a remote monitor that obtains a present value of a set point for at least one piece of equipment by communicating with a controller controlling the at least one piece of equipment according to the set point. The remote monitor may also determine a first power consumption rate corresponding to power consumption of the at least one piece of equipment while operating at the present value of the set point, and a second power consumption rate corresponding to power consumption of the at least one piece of equipment while operating at a predetermined benchmark value of the set point. The remote monitor may also communicate a monetary cost to a remote user when the first power consumption rate is greater than the second power consumption rate, the monetary cost being based on a difference between the first power consumption rate and the second power consumption rate and a power consumption cost.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
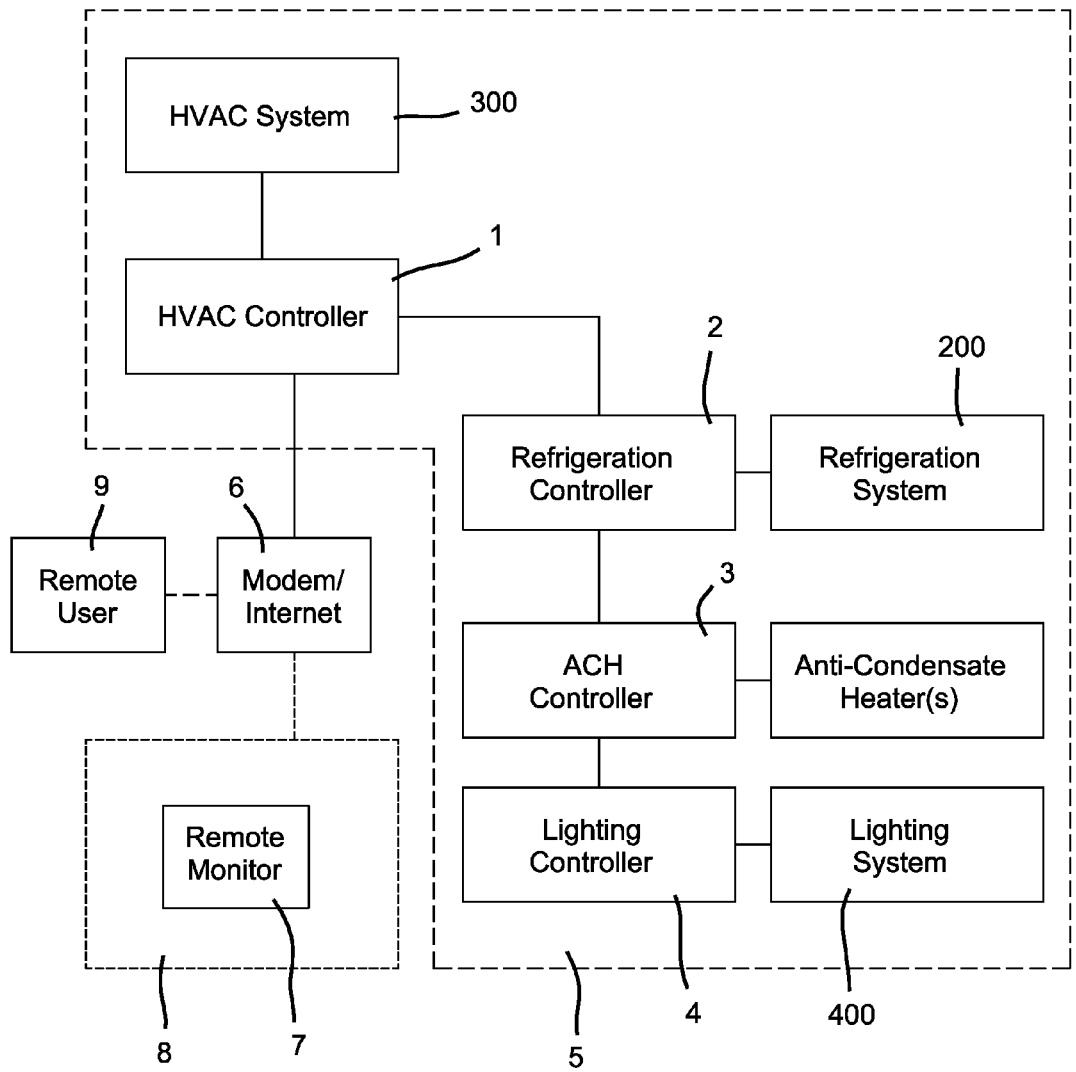
FIG. 1 is a schematic illustration of a building system for use with the method for analyzing the building system performance according to the principles of the present disclosure.

The present system for monitoring optimal equipment operating parameters provides a comprehensive building system assessment and energy management solution. The system is particularly applicable to refrigeration, HVAC, lighting, anti-condensate heating (ACH), and defrost control systems. As shown in FIG. 1, an HVAC controller 1 is in communication with a refrigeration controller 2, an ACH condensate heater controller 3, and a lighting controller 4. These components are typically located in a building 5. Further, the HVAC controller 1 is in communication via communication network 6, including a modem or internet connection, to a remote monitor 7 at a remote location 8. As shown, the HVAC controller 1 communicates with the HVAC system, with the refrigeration controller 2, the ACH controller 3, and the lighting controller 4, which respectively communicate with the refrigeration system, the anti-condensate heaters, and lighting system. Although the HVAC controller 1 is shown as a communication gateway between the various controllers 2, 3, 4 and the remote monitor 7, it will be appreciated that any of the controllers 1-4 can function as a communication gateway. Alternatively, each controller 1, 2, 3, 4 can be connected to a network backbone that has a dedicated communication gateway (such as a personal computer, server computer or other controller) to provide internet, modem or other remote access. It will be appreciated that the illustration of FIG. 1 is merely exemplary, and more or fewer building control systems may be included.

Figure 2:
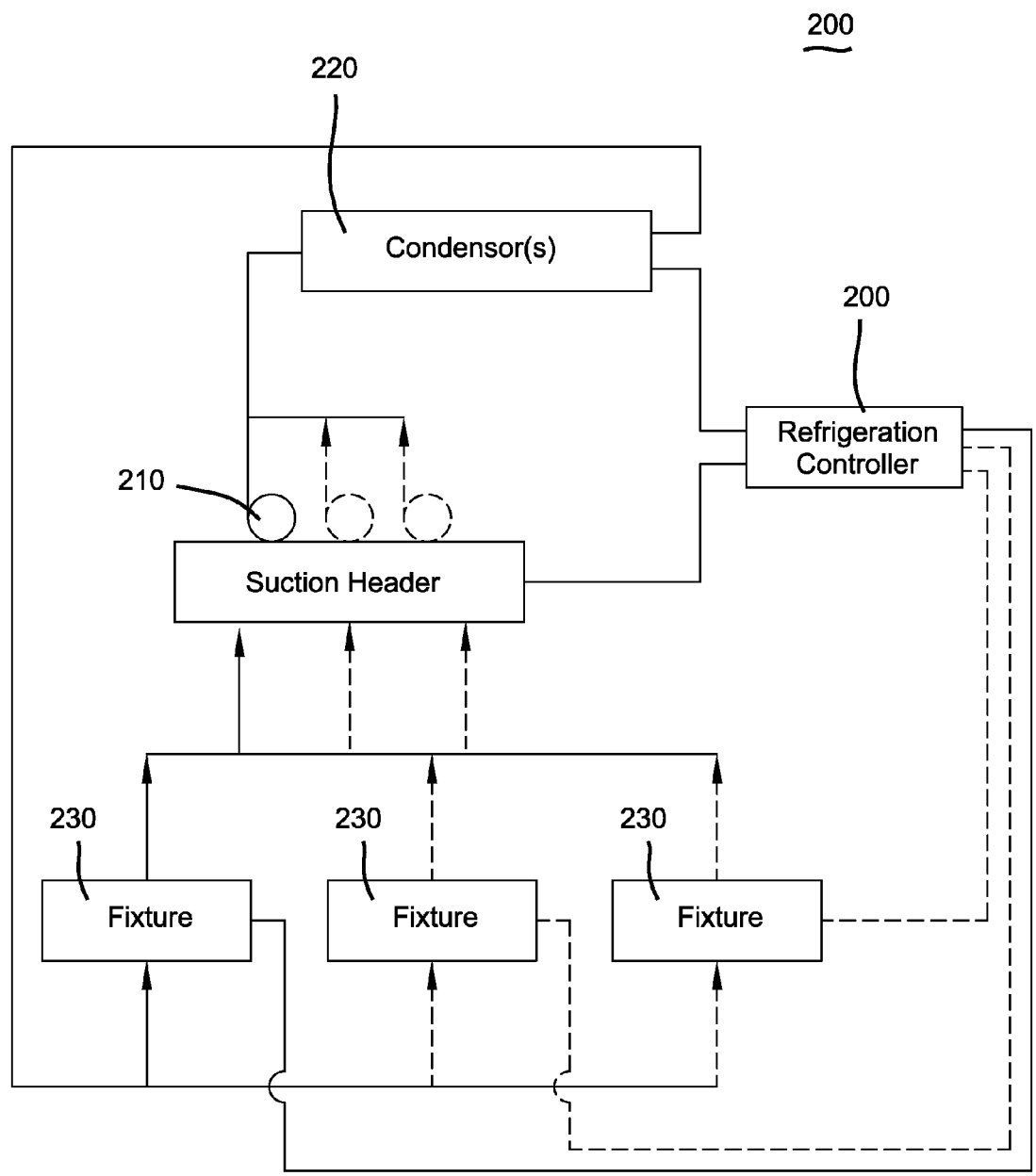
FIG. 2 is a schematic illustration of an exemplary refrigeration system according to the principles of the present disclosure.

With reference to FIG. 2, a basic refrigeration system 200 is shown. The refrigeration system 200 includes one or more compressors 210, condensers 220 and refrigeration fixtures 230. The condensers 220, compressors 210, and refrigeration fixtures 230 communicate with the refrigeration controller 2. Such communication may be networked, dedicated direct connections or wireless.

Figure 3:
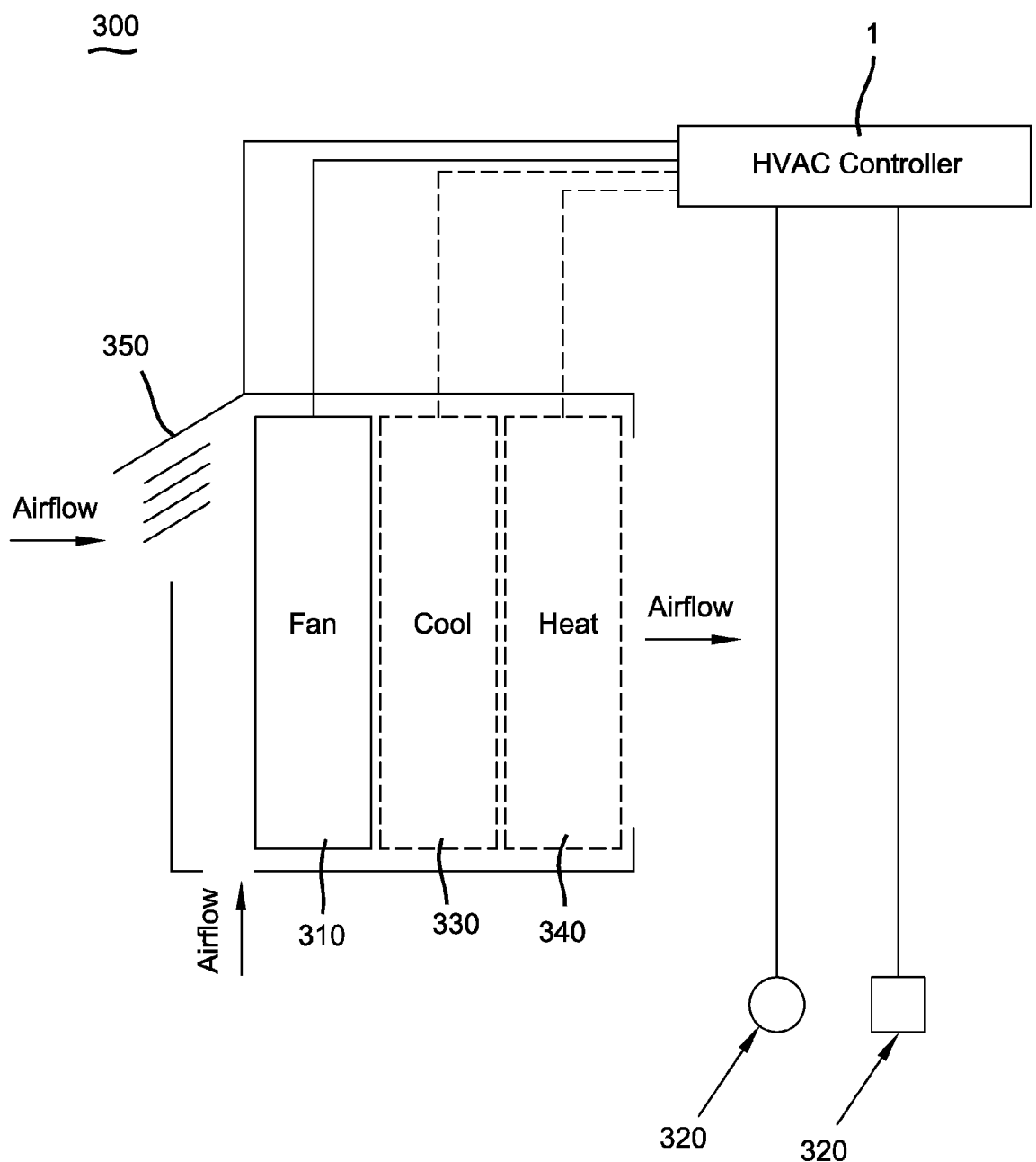
FIG. 3 is a schematic illustration of an exemplary HVAC system according to the principles of the present disclosure.

Similarly with FIG. 3, an exemplary HVAC system 300 is shown. As shown, the HVAC controller 1 communicates with a fan 310 and sensors 320, as well as a cooling apparatus 330, heating apparatus 340 and damper 350, if appropriate. The fan 310, cooling apparatus 330, heating apparatus 340 and damper 350 communicate with the HVAC controller 1. Such communication may be networked, dedicated direct connections or wireless.

Figure 4:
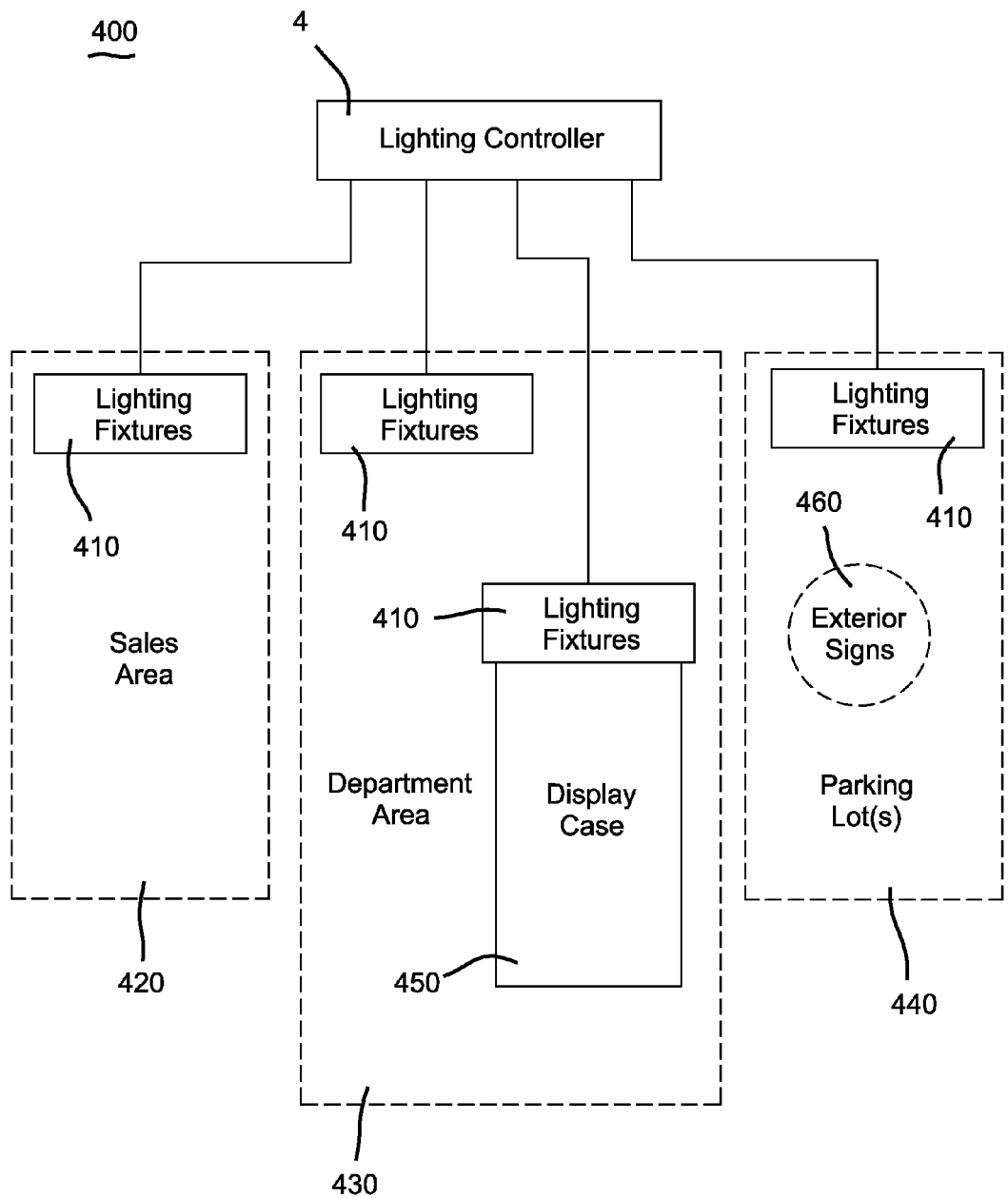
FIG. 4 is a schematic illustration of an exemplary lighting system according to the principles of the present disclosure.

FIG. 4 shows a lighting system 400. As shown, one or more lighting fixtures 410 communicate with the lighting controller 4. The lighting fixtures 410 are shown in various areas of the building and its exterior, with some areas including multiple types of fixtures while lighting fixtures for multiple areas may also be similarly controlled. For example, FIG. 4 illustrates a sales area 420, a department area 430 and a parking lot 440. The department area 430 includes lighting fixtures 410, as well as lighting fixtures 410 for display cases 450 therein. The parking lot 440 includes lighting fixtures 410 as well as an exterior sign lighting 460. The various lighting fixtures 410 are in communication with the lighting controller 4. Such communication may be networked, dedicated direct connections or wireless.

Figure 5:
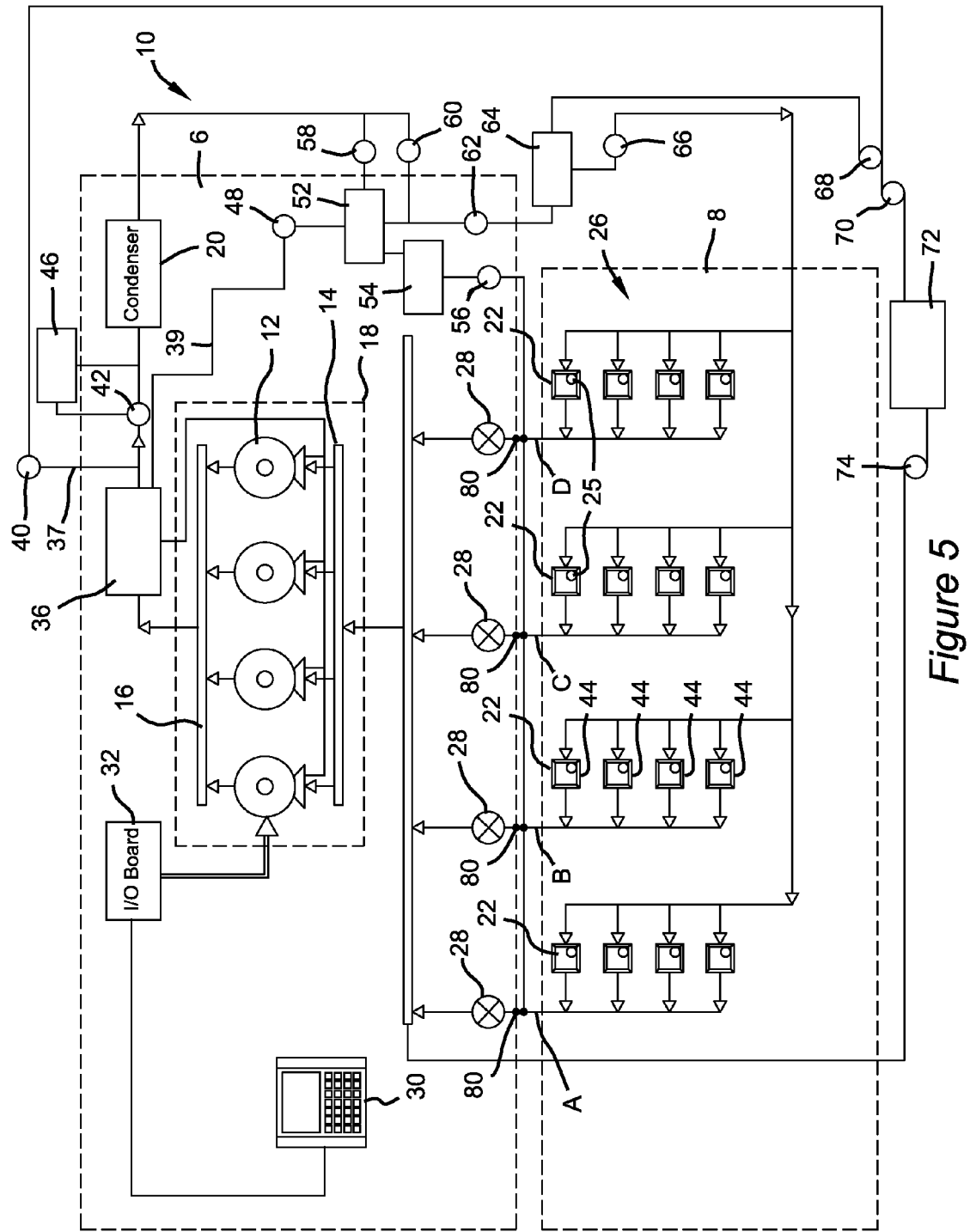
FIG. 5 is a detailed schematic illustration of an exemplary refrigeration system according to the principles of the present disclosure.
Figure 2:
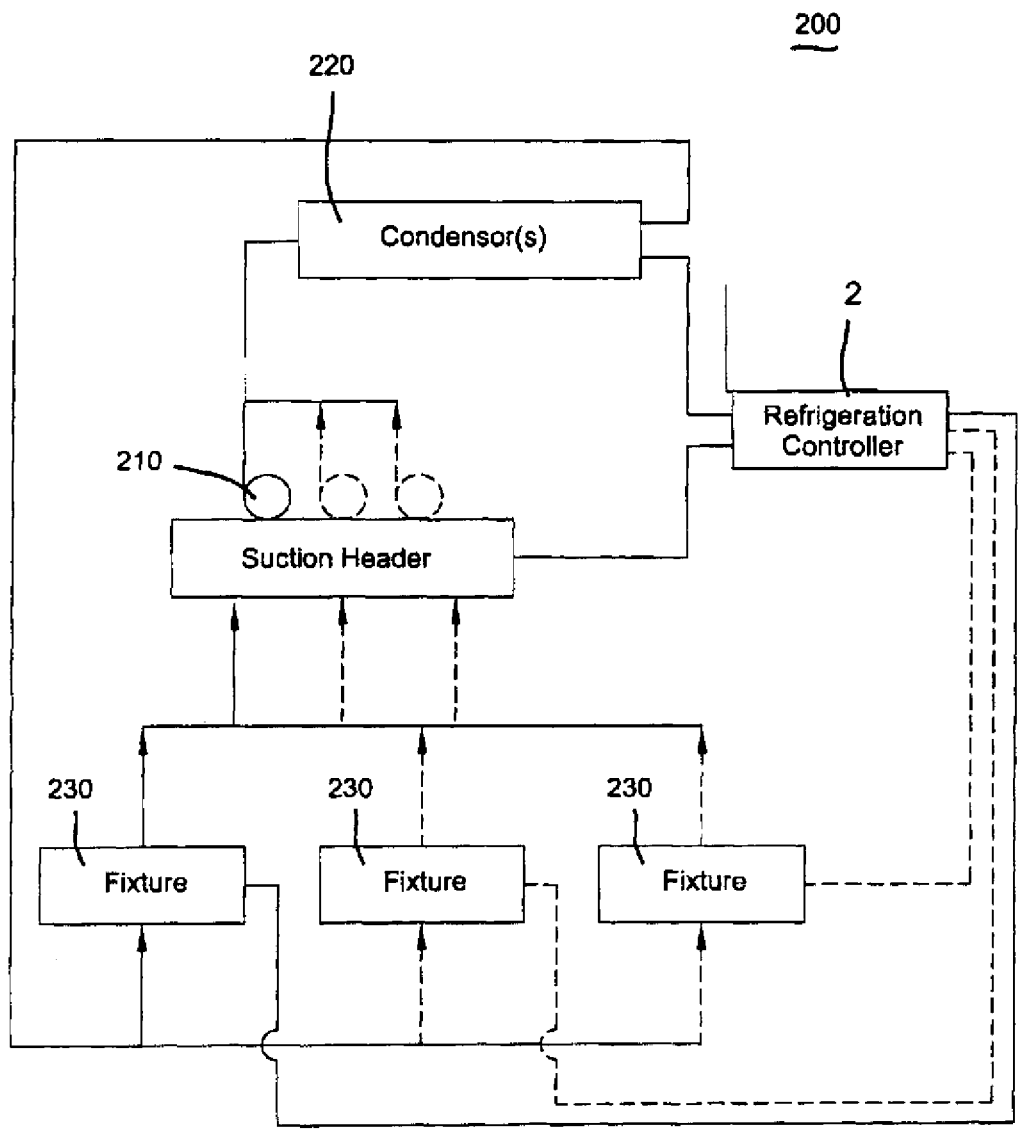

With reference to FIG. 5, a detailed block diagram of the exemplary refrigeration system 200 is shown. The refrigeration system 200 includes a plurality of compressors 12 piped together with a common suction header 14 and a discharge header 16 all positioned within a compressor rack 18. The compressor rack 18 compresses refrigerant vapor that is delivered to an oil separator 36 from which the vapor is delivered via a first line 37 to a hot gas defrost valve 40 and a three-way heat reclaim valve 42. The hot gas defrost valve 40 enables hot gas to flow to an evaporator (not shown) through liquid line solenoid valve 70 and solenoid valve 68. The heat reclaim valve 42 enables hot gas to flow to the heat reclaim coils 46 and to a condenser 20 where the refrigerant vapor is liquefied at high pressure.

A second line 39 of the oil separator 36 delivers gas through a receiver pressure valve 48 to a receiver 52. The receiver pressure valve 48 ensures the receiver pressure does not drop below a set value. The condenser 20 sends fluid through a condenser flood back valve 58 to the receiver 52. The condenser flood back valve 58 restricts the flow of liquid to the receiver 52 if the condenser pressure becomes too low.

Evaporator pressure regulator (EPR) valves 28 are mechanical control valves used to maintain a minimum evaporator pressure in cases 22. The EPR valves 28 operate by restricting or opening a control orifice to raise or lower the pressure drop across the valve, thereby maintaining a steady valve inlet (and associated evaporator pressure) even as the evaporator load or rack suction pressure varies in response to the addition or subtraction of compressor capacity or other factors.

A surge valve 60 enables liquid to bypass the receiver 52 when it is subcooled in the ambient. Accordingly, ambient subcooled liquid joins liquid released from the receiver 52, and is then delivered to a differential pressure regulator valve 62. During defrost, the differential pressure regulator valve 62 reduces pressure delivered to the liquid header 64. This reduced pressure enables reverse flow through the evaporator during defrost. Liquid flows from liquid header 64 via a first line through a liquid branch solenoid valve 66, which restricts refrigerant to the evaporators during defrost but enables back flow to the liquid header 64. A second line carries liquid from the liquid header 64 to the hot gas defroster 72 where it exits to an EPR/Sorit valve 74. The EPR/Sorit valve 74 adjusts so the pressure in the evaporator is greater than the suction header 14 to enable the evaporator to operate at a higher pressure.

The high-pressure liquid refrigerant leaving liquid branch solenoid valve 66 is delivered to a plurality of refrigeration cases 22 by way of piping 24. Circuits 26 consisting of a plurality of refrigeration cases 22 operate within a certain temperature range. FIG. 5 illustrates four (4) circuits 26 labeled circuit A, circuit B, circuit C and circuit D. Each circuit 26 is shown consisting of four (4) refrigeration cases 22. However, those skilled in the art will recognize that any number of circuits 26, as well as any number of refrigeration cases 22 may be employed within a circuit 26. As indicated, each circuit 26 will generally operate within a certain temperature range. For example, circuit A may be for frozen food, circuit B may be for dairy, circuit C may be for meat, etc.

Because the temperature requirement is different for each circuit 26, each circuit 26 includes a EPR valve 28 that acts to control the evaporator pressure and, hence, the temperature of the refrigerated space in the refrigeration cases 22. The EPR valves 28 can be electronically or mechanically controlled. Each refrigeration case 22 also includes its own expansion valve (not shown) that may be either a mechanical or an electronic valve for controlling the superheat of the refrigerant. In this regard, refrigerant is delivered by piping to the evaporator in each refrigeration case 22. The refrigerant passes through an expansion valve where a pressure drop causes the high pressure liquid refrigerant to become a lower pressure combination of liquid and vapor. As the hot air from the refrigeration case 22 moves across the evaporator, the low pressure liquid turns into gas. This low pressure gas is delivered to the pressure regulator 28 associated with that particular circuit 26. At EPR valves 28, the pressure is dropped as the gas returns to the compressor rack 18. At the compressor rack 18, the low pressure gas is again compressed to a high pressure gas, which is delivered to the condenser 20, which creates a high pressure liquid to supply to the expansion valve and start the refrigeration cycle over.

A main refrigeration controller 2 is used and configured or programmed to control the operation of the refrigeration system 200. The refrigeration controller 2 is preferably an Einstein Area Controller offered by CPC, Inc. of Atlanta, Ga., U.S.A., or any other type of programmable controller which may be programmed, as discussed herein. The refrigeration controller 2 controls the bank of compressors 12 in the compressor rack 18 via an input/output module 32. The input/ output module 32 has relay switches to turn the compressors 12 on and off to provide the desired suction pressure. A separate case controller (not shown), such as a CC-100 case controller, also offered by CPC, Inc. of Atlanta, Ga., U.S.A., may be used to control the superheat of the refrigerant to each refrigeration case 22 via an electronic expansion valve in each refrigeration case 22 by way of a communication network or bus 34. Alternatively, a mechanical expansion valve may be used in place of the separate case controller. Should separate case controllers be utilized, the main refrigeration controller 2 may be used to configure each separate case controller, also via the communication bus 34. The communication bus 34 may be a RS-485 communication bus, a LonWorks Echelon bus or any other communication platform that enables the main refrigeration controller 30 and the separate case controllers to receive information from each case 22.

Each refrigeration case may have a temperature sensor 44 associated therewith, as shown for circuit B. The temperature sensor 44 can be electronically or wirelessly connected to the controller 2 or the expansion valve for the refrigeration case. Each refrigeration case 22 in the circuit B may have a separate temperature sensor 44 to take average/minimum/maximum temperatures or a single temperature sensor 44 in one refrigeration case 22 within circuit B may be used to control each case 22 in circuit B because all of the refrigeration cases 22 in a given circuit operate in substantially the same temperature range. These temperature inputs are preferably provided to the analog input board 38, which returns the information to the main refrigeration controller via the communication bus 34.

The particular set points of the various equipment of the refrigeration system 200 are preferably set to optimized values to achieve efficient operation of the refrigeration system 200. These optimized values are benchmark values preferably determined during a system performance analysis. Such a method is disclosed in commonly assigned U.S. Patent Application No. 60/287,458, entitled Building System Performance Analysis, which is expressly incorporated herein by reference. In short, the method includes an examination of existing system conditions and operating parameters using a combination of remote monitoring and on-site technicians. A series of prescribed testing and adjustment procedures are also conducted. Through a continuous follow-up process and associated feedback-loop activities, optimized operating parameters (i.e., set points) of the various equipment are determined to maintain the system in an enhanced performance state. Although the optimized operating parameters of the refrigeration system 200 are preferably determined implementing the method described immediately above, it will be appreciated that other methods may be used.

While the present disclosure is discussed in detail below with respect to specific components as contained in refrigeration system 200, it will be appreciated that the present disclosure may be employed with other types of systems having configurable components to provide substantially the same results as discussed herein. By way of example, other types of systems include, but are not limited to HVAC, lighting, ACH, and defrost.

Initially, application-specific operating parameters, or set points, are determined for the equipment of the refrigeration system 200. These set points include control method (e.g., pressure, temperature), suction float, minimum float point, maximum float point, suction group set point, control sensor offset, condenser set point, and ambient sensor offset. More particularly, the set points preferably include minimum head pressure, air-cooled condenser fan speed, hold-back valve pressure, evaporator condenser sump temperature, receiver pressurization valve, EPR valve pressure, suction pressure, and discharge pressure. As discussed above, these set points are preferably determined implementing the system performance analysis method.

With regard to the HVAC systems 300, set points include cooling, heating, dehumidification, cooling override, heating override and fan override. With regard to defrost, set points include number of defrosts per day, defrost duration, termination type and termination temperature. For the lighting system 400, set points include light level, on time and off time.

The monitoring method of the present disclosure initially includes each controller 1, 2, 3, 4 monitoring the equipment set points of their respective systems. It is anticipated that the controllers 1, 2, 3, 4 either continuously monitor the set points, periodically monitor the set points, or are alerted to a set point change. Continuous, and alert monitoring of the set points enable the particular controller to determine the precise time a set point change occurred. Periodically monitoring the set points enables the particular controller to determine a time range, within which a set point change occurred. The remote monitor 7 periodically communicates with the controllers 1, 2, 3, 4 through the communication network 6 to obtain the various set point information.

The remote monitor 7 stores the set point information in memory for the various systems of building 5. The remote monitor 7 periodically communicates with the controllers 1, 2, 3, 4 to obtain present set point information. The remote monitor 7 also records the base or benchmark set points for the equipment of the various systems. In this manner, the benchmark set point is stored for informational purposes. The remote monitor 7 initially records the benchmark set point as a prior set point. The remote monitor 7 compares the monitored, or present set point to the prior set point for the individual equipment. In this manner, the remote monitor 7 determines whether a change in any of the set points has occurred. If there is no difference between the present set point and the prior set point, then the remote monitor 7 continues monitoring with no other action. If there is a difference between the present set point and the prior set point, the remote monitor 7 stores into memory the present set point as well as the time that the set point change occurred.

Once the set point information has been recorded into memory, the remote monitor 7 overwrites the prior set point, recording the present set point as the prior set point. In this manner, the prior set point is consistently updated after a change in set point occurs and continues to be the value compared against to determine whether further changes in set point have occurred.

It is also anticipated that the controllers 1, 2, 3, 4 can continuously monitor the set point changes in their respective systems and alert the remote monitor of a change in set point. More specifically, the local controllers 1, 2, 3, 4 store the benchmark set point. The controllers initially record the benchmark set point as the prior set point. The controllers compare the monitored, or present set point to the prior set point for the individual equipment. In this manner, the controllers determine whether a change in any of the set points has occurred. If there is no difference between the present set point and the prior set point, then the controllers continue monitoring with no other action. If there is a difference between the present set point and the prior set point, the controllers store into memory the present set point as well as the time that the set point change occurred.

Once the set point information has been recorded into memory, the controllers overwrite the prior set point, recording the present set point as the prior set point. In this manner, the prior set point is consistently updated after a change in set point occurs and continues to be the value compared against to determine whether further changes in set point have occurred.

Regardless of whether the local controllers 1, 2, 3, 4 or the remote monitor 7 monitor the set point changes, the remote monitor 7 inputs the set point information into a database. The database is accessible via the communication network 6 by a remote user 9. The database sorts the set point information such that it is accessible by the remote user 9 in a variety of manners via a web interface. For example, the remote user 9 may select a particular location (e.g., building 5) to view the set point changes, and present set point values at that particular location. Additionally, the remote user 9 is able to view the benchmark set points of the various equipment within a particular location, the present set point, and the set point used prior to the benchmark set point. Further, the remote user 9 can access a summary of the set point changes which have occurred across all of the locations. The various set point information is accessible for any of the systems, including the refrigeration system 200, ACH, defrost, HVAC 300, and lighting 400 systems.

The remote monitor 7 further associates the set points and set point changes with a cost. The set points of the various equipment within the systems signal the equipment to operate consuming an associated amount of power. A set point change alters the amount of power required by a piece of equipment to operate. Thus, a comparison of set points can indicate an increase, or decrease in power consumption. Standardized costs are available throughout different regions to determine a cost associated with a particular power consumption rate. More particularly, the remote monitor 7 is able to access a database that maintains a record of power consumption costs for various regions, or even particular locations. The remote monitor 7 is able to determine a rate of power consumption for a particular piece of equipment at the benchmark set point, and compare that to a rate of power consumption at the present set point. If there is a difference between the two, the remote monitor is able to associate this difference with a cost. In this manner, the remote user 9 may determine the effect a set point change has on the overall operating costs of the particular system for a chosen time period (e.g., days, weeks, years, etc.).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

What is claimed is:

1. A method comprising:
    obtaining a present value of a set point for at least one piece of equipment with a remote monitor in communication with a controller that controls the at least one piece of equipment according to the set point, the set point being stored in a memory accessible to the controller;
    determining a first power consumption rate with the remote monitor, the first power consumption rate corresponding to power consumption of the at least one piece of equipment while operating at the present value of the set point;
    determining a second power consumption rate with the remote monitor, the second power consumption rate corresponding to power consumption of the at least one piece of equipment while operating at a predetermined benchmark value of the set point;
    comparing, with the remote monitor, the first power consumption rate to the second power consumption rate and determining whether the first power consumption rate is greater than the second power consumption rate and, based on the comparing, determining that the first power consumption rate is greater than the second power consumption rate;
    determining a monetary cost associated with a difference between the first power consumption rate and the second power consumption rate, based on a power consumption cost, when the remote monitor determines that the first power consumption rate is greater than the second power consumption rate;
    communicating the monetary cost, with the remote monitor, to a remote user.

2. The method of claim 1, wherein the predetermined benchmark value of the set point is a previous value of the set point.

3. The method of claim 1, wherein the predetermined benchmark value is determined during a system performance analysis for the at least one piece of equipment.

4. The method of claim 1, further comprising:
    determining the power consumption cost based on a location of the at least one piece of equipment.

5. The method of claim 4, wherein the determining the power consumption cost based on the location of the at least one piece of equipment includes accessing, with the remote monitor, a power consumption cost database that stores power consumption cost data for at least one of a plurality of regions and a plurality of particular locations.

6. The method of claim 1, further comprising:
    communicating, with the remote monitor, at least one of the present value of the set point, the benchmark value of the set point, the first power consumption rate, and the second power consumption rate, to the remote user.

7. The method of claim 1, wherein the at least one piece of equipment is a component of a refrigeration system and the set point is selected from the group comprising: a pressure, a temperature, a control method, a suction float point, a minimum float point, a maximum float point, a suction group set point, a control sensor offset, a condenser set point, an ambient sensor offset, a minimum head pressure, an air-cooled condenser fan speed, a hold-back valve pressure, an evaporator condenser sump temperature, a receiver pressurization valve pressure, an EPR valve pressure, a suction pressure, and a discharge pressure.

8. The method of claim 1, wherein the at least one piece of equipment is a component of an HVAC system and the set point is selected from the group comprising:
    a cooling set point, a heating set point, a dehumidification set point, a cooling override, a heating override, and a fan override.

9. The method of claim 1, wherein the at least one piece of equipment is a component of an a defrost system and the set point is selected from the group comprising: a number of defrosts per day, a defrost duration, a termination type, and a termination temperature.

10. The method of claim 1, wherein the at least one piece of equipment is a component of an lighting system and the set point is selected from the group comprising: a light level, an on time, and an off time.

11. The method of claim 1, wherein the at least one piece of equipment is a component of an anti-condensate heating system.

12. A system comprising a remote monitor that obtains a present value of a set point for at least one piece of equipment by communicating with a controller controlling the at least one piece of equipment according to the set point, the set point being stored in a memory accessible to the controller, wherein the remote monitor determines a first power consumption rate corresponding to power consumption of the at least one piece of equipment while operating at the present value of the set point, determines a second power consumption rate corresponding to power consumption of the at least one piece of equipment while operating at a predetermined benchmark value of the set point, compares the first power consumption rate to the second power consumption rate, determines, based on the comparison, that the first power consumption rate is greater than the second power consumption rate, and communicates a monetary cost to a remote user when it is determined that the first power consumption rate is greater than the second power consumption rate, the monetary cost being based on a difference between the first power consumption rate and the second power consumption rate and a power consumption cost.

13. The system of claim 12, wherein the predetermined benchmark value of the set point is a previous value of the set point.

14. The system of claim 12, wherein the predetermined benchmark value is determined during a system performance analysis for the at least one piece of equipment.

15. The system of claim 12, wherein the power consumption cost is based on a location of the at least one piece of equipment.

16. The system of claim 12, wherein the remote monitor determines the power consumption cost by accessing a power consumption cost database that stores power consumption cost data for at least one of a plurality of regions and a plurality of particular locations.

17. The system of claim 12, wherein the remote monitor communicates at least one of the present value of the set point, the benchmark value of the set point, the first power consumption rate, and the second power consumption rate, to the remote user.

18. The system of claim 12, wherein the at least one piece of equipment is a component of a refrigeration system and the set point is selected from the group comprising: a pressure, a temperature, a control method, a suction float point, a minimum float point, a maximum float point, a suction group set point, a control sensor offset, a condenser set point, an ambient sensor offset, a minimum head pressure, an air-cooled condenser fan speed, a hold-back valve pressure, an evaporator condenser sump temperature, a receiver pressurization valve pressure, an EPR valve pressure, a suction pressure, and a discharge pressure.

19. The system of claim 12, wherein the at least one piece of equipment is a component of an HVAC system and the set point is selected from the group comprising:
a cooling set point, a heating set point, a dehumidification set point, a cooling override, a heating override, and a fan override.

20. The system of claim 12, wherein the at least one piece of equipment is a component of an a defrost system and the set point is selected from the group comprising: a number of defrosts per day, a defrost duration, a termination type, and a termination temperature.

21. The system of claim 12, wherein the at least one piece of equipment is a component of an lighting system and the set point is selected from the group comprising: a light level, an on time, and an off time.

22. The system of claim 12, wherein the at least one piece of equipment is a component of an anti-condensate heating system.

* * * * *

UNITED STATES PATENT AND TRADEMARK OFFICE
CERTIFICATE OF CORRECTION

| | |
|---|---|
| PATENT NO. | : 8,700,444 B2 |
| APPLICATION NO. | : 12/955355 |
| DATED | : April 15, 2014 |
| INVENTOR(S) | : Abtar Singh |

It is certified that error appears in the above-identified patent and that said Letters Patent is hereby corrected as shown below:

In the Drawings

Delete drawing sheet 2, and substitute the attached drawing sheet 2 therefor.

Sheet 2 of 5, Figure 2            Delete "200" and insert --2--.

In the Specification

Column 5, Detailed Description, Line 15            Delete "30" and insert --2--.

Signed and Sealed this
Twenty-third Day of September, 2014

Michelle K. Lee
*Deputy Director of the United States Patent and Trademark Office*